United States Patent Office 3,328,176
Patented June 27, 1967

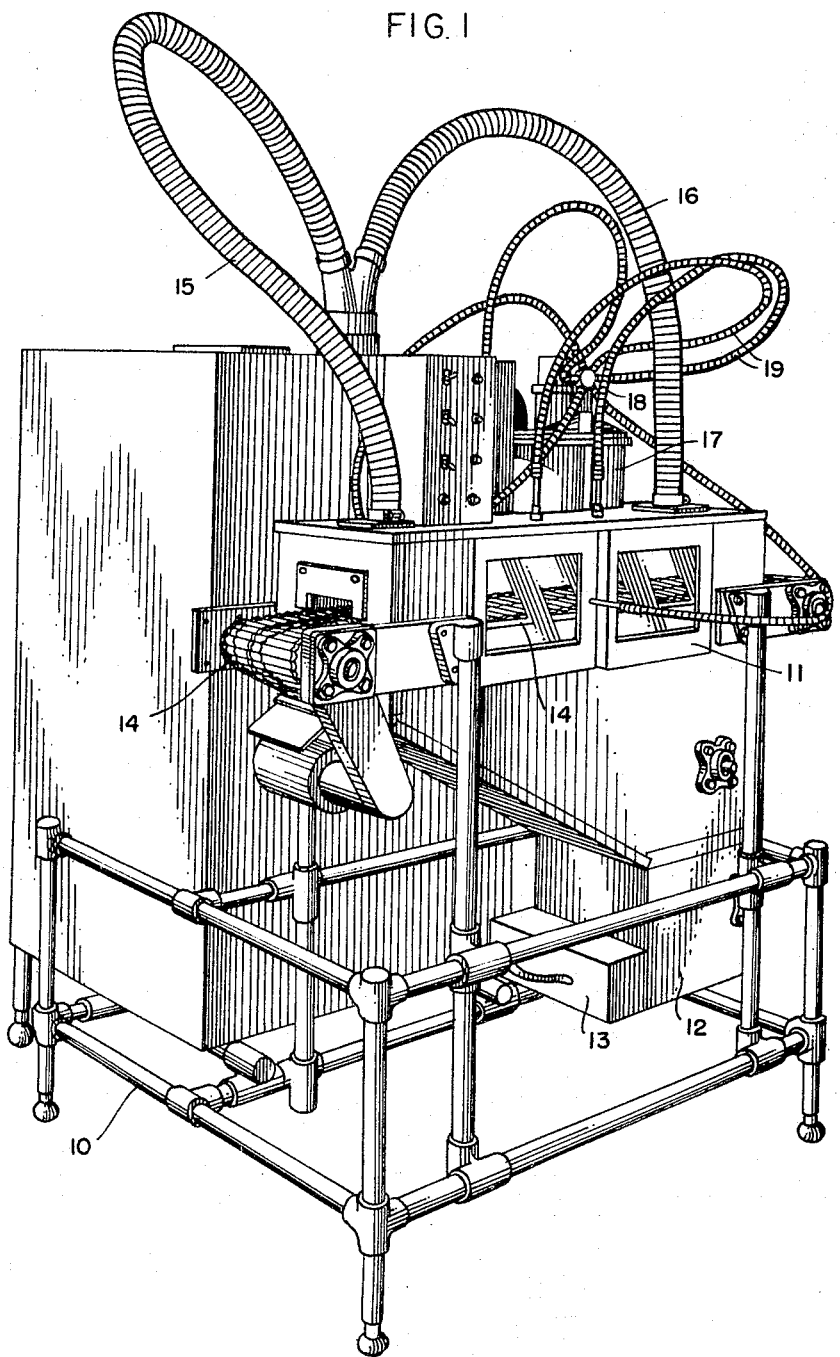

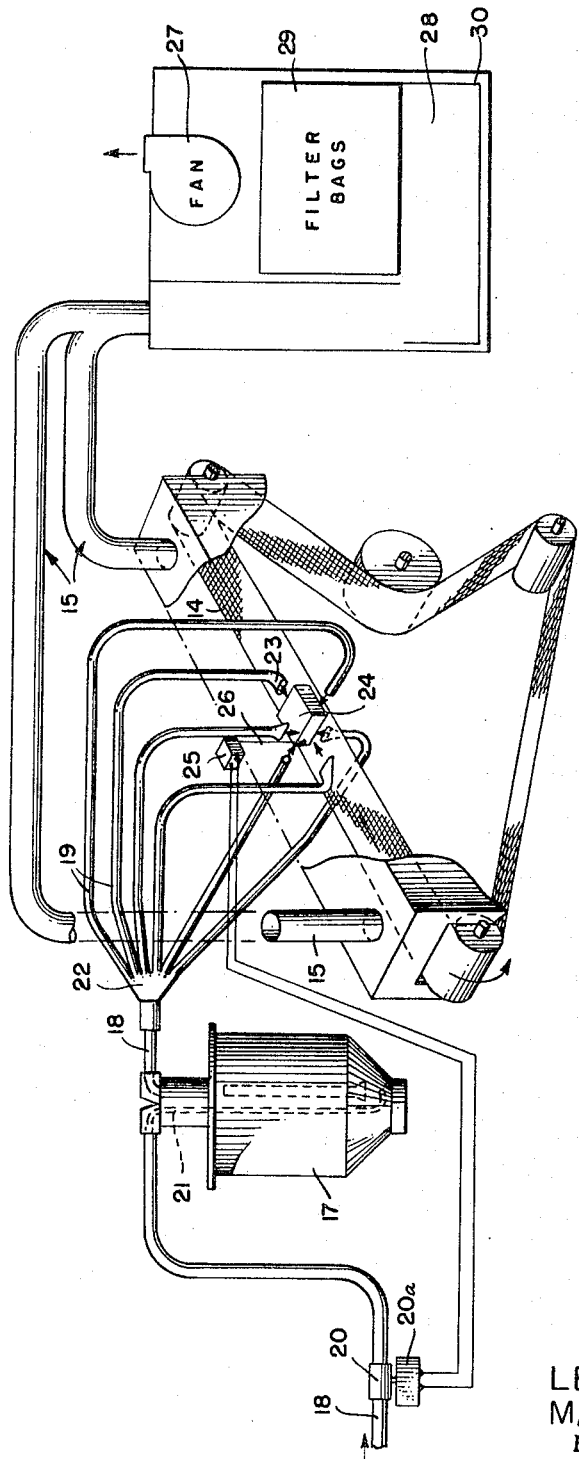

3,328,176
CHEESE TREATING METHODS
Leo J. Hansen, Clarendon Hills, and Maurice B. Westover, Chicago, Ill., assignors to Armour and Company, Chicago, Ill., a corporation of Delaware
Filed May 28, 1965, Ser. No. 461,226
2 Claims. (Cl. 99—162)

This is a continuation-in-part of the abandoned application Ser. No. 286,578, filed June 10, 1963. This invention relates to cheese treating methods and apparatus, and more particularly to methods and means for treating cheese with anti-microbial food spoilage agents in dry form. The invention is applicable also to the treatment of other like plastic bodies.

Present-day centralized cutting and wrapping operations and merchandising methods as practiced in the cheese industry result in a lengthening of the period of time that wrapped consumer-size pieces of cheese remain in trade channels. This situation permits the development of undesirable molds upon the packaged product despite improved sanitation practices in cheese production and wrapping. It is, therefore, necessary to treat the cheese product with harmless food-grade spoilage inhibitors, such as, for example, sorbic acid. Utilization of sorbic acid for the treatment of process cheese has presented no particular problem because the chemical may be simply added to the blend of cheese going into the processing kettle and thus distributed throughout the cheese mass. This procedure, however, is not suitable for natural Cheddar, Swiss, and other cheese in consumer-size pieces, and a problem has long existed with respect to the treatment of such products. Dipping or spraying with solutions is not desirable because the added moisture interferes with wrapping and package sealing. Also, in view of the nature of the fissured surfaces of Cheddar and the eyes in Swiss cheese, there is the possibility of excess liquid antimycotic material collecting in the fissures and eyes of these products.

Treatment with the mold inhibitor in the form of a dry powder further presents a problem because of the difficulty of uniform application and because loosely-applied powder tends to shake off in the conveying system and to be removed in areas during the wrapping and sealing processes. Excessive amounts of the chemical dust or powder on the cheese blocks are not permitted by legal standards, result in a disagreeable taste, and the presence of the dust in the atmosphere is highly irritating to the processing personnel. Further, substantial losses of the powder acid product are experienced in dusting operations. For effective mold-inhibiting action, it is important to apply to the surfaces of the cheese pieces at least 0.1 percent of an inhibitor, based on the weight of the cheese, such as sorbic acid, and to apply not more than the legal maximum of 0.3 percent. If a dry powder is employed in the treating operation, it is extremely difficult to apply to the cheese surface and to retain thereon a coating which is relatively uniform and which lies within this narrow range, and should areas of the cheese have less than 0.05 percent, effective resistance to mold is not provided, and if certain areas have more than 0.3 percent, taste and other disadvantages are present.

A primary object, therefore, of the invention is to provide a solution for the problem described above and to provide a means and method for treating cheese pieces to obtain effective coating of the pieces within important critical limits. A further object is to provide a method and means for applying powdered mold inhibitor to cheese bodies in a manner to uniformly coat the bodies. A still further object is to provide for the treatment of cheese and other plastic bodies with dry powder so as to cover said surfaces with a uniform coating of adhering powder. A further object is to provide apparatus for treating plastic bodies with impinging gas streams carrying powder so as to embed said powder in said bodies to provide a uniform coating of powder while also providing means for the recovery of excess powder and the reuse thereof. A still further object is to provide for the treating of cheese and other plastic bodies with powder in a confined zone and in which powder is carried by air streams under pressure for impingement upon the bodies, while also maintaining said zone under negative pressure for the removal of excess and floating powder particles. Other specific objects and advantages will appear as the specification proceeds.

The invention is shown, in illustrative embodiments, by the accompanying drawings, in which:

FIG. 1 is a perspective view of apparatus embodying our invention and which may be employed in the practice of methods embodying our invention; and FIG. 2, a schematic view illustrating important elements of apparatus which may be employed in the practice of our invention.

In the illustration given in FIG. 1, we provide a framework 10 on which is supported a conveyor housing 11. The housing 11 provides a chamber having at its bottom a receptacle 12 in which is mounted a slide drawer 13, the drawer 13 being provided for receiving excess powder. In the upper portion of the closed housing 11 is mounted an open mesh conveyor 14 adapted to carry the cheese body to be treated, and the housing 11 provides entrance and discharge ports for receiving the cheese bodies. Communicating with the housing 11 are suction ducts 15 and 16 which lead to a fan and to filter bags (not shown). A powder receptacle 17 contains a supply of sorbic acid, etc. in powder form, and the air-powder mixture is delivered to a manifold 18 as compressed air is passed through the powder pump assembly. From the manifold, a series of small tubes 19 lead to various positions about the conveyor 14 so as to discharge the compressed air carrying the powder upon all surfaces of the cheese.

Since the operating parts are shown more clearly and in greater detail in the schematic view of FIG. 2, reference is now made to FIG. 2. Compressed air from a source of supply passes through conduit or manifold 18 which is controlled by the solenoid-operated valve 20. Communicating with the conduit 18 is a powder pump 21 with an air ejector tube extending downwardly into the bottom portion of the powder reservoir of receptacle 17. The discharge ducts 19 communicate with the manifold conduit 18 through a fitting member 22. The ducts or tubes 19 preferably terminate in flared discharge nozzles 23 which are designed to apply the powder to the various surfaces of the cheese piece or block 24. The cheese piece 24 has six sides, and the nozzles 23 are so distributed as to apply the powder evenly with respect to each side, each nozzle being so flared or designed and being so positioned with respect to the cheese block as to cover the area of the face of the cheese toward which the nozzle is directed. Since the conveyor is an open mesh conveyor, the nozzle below the belt is effective in covering the bottom side of the cheese piece simultaneously with the application of the powder to the top and other sides of the cheese piece.

Supported above the conveyor 14 is a micro-switch 25 which controls through a relay solenoid 20a governing valve 20. An actuating arm 26 from the micro-switch 25 is engaged by the cheese block 24 as it moves forwardly, thus actuating the micro-switch 25 for the opening of valve 20. As the cheese block moves forward during treatment past the arm 26, the arm swings back to its initial position to bring about the closing of valve 20.

In the schematic view shown in FIG. 2, the housing 11 is shown in a fragmentary way, but it will be understood that the housing encloses the conveyor and a portion of the tubes 19, as shown more clearly in the structure of FIG. 1. Communicating with the housing 11 and in order to maintain it under negative pressure are duct means 15 leading to a suction blower 27. The withdrawn powder is discharged into the chamber 28 and the air is forced through the filter bag 29 thereabove. Settled powder may be collected from the lower receptacle 30.

In practice, it is found that the majority of the excess powder is collected in the drawer 13 illustrated in FIG. 1, and instead of employing a drawer, it will be understood that connections may be provided for the automatic return of the powder through sieving apparatus to the supply chamber 17 for reuse. Withdrawn air through the ducts 15 and recovered powder from the filter receptacle 29 may also be returned to the supply chamber 17 for reuse.

In the foregoing operation and apparatus, it is found that an accurate application of the treating powder to all sides of the cheese or plastic body is accomplished so that the body is coated with a uniformly embedded cover of sorbic acid dust at a given chosen level between 0.05 and 0.3 percent of the weight of the cheese. This is accomplished by impinging the compressed air carrying the powder with force upon the cheese body. The powder particles under the force of the impinging streams stick to the cheese body because a substantial number of particles become embedded in the cheese and serve as lodging means or retainers for the applied powder. Further, the particles thus effectively applied to the cheese body remain thereon during travel on the conveyor and during subsequent wrapping and packaging procedure.

While the pressure employed may be varied depending upon the treating powder employed, we prefer to use pressures in the range of 10 to 35 pounds per square inch. Excellent results have been obtained by using about 25 pounds per square inch at the powder pump. With these pressures, sorbic acid particles are retained upon the cheese body in coatings of little more than 0.1 percent based on weight of the cheese.

The open mesh conveyor 14 may be supported by any suitable number of rollers, and one or more of the rollers may be driven. In the specific illustration given in FIGS. 1 and 2, the roller 30 is driven by a motor (not shown). The conveyor speed of the specific apparatus illustrated in FIG. 1 is about 42 feet per minute in order to synchronize with the speed of the wrapping line conveyor, but it will be understood that the speed may be varied greatly, and the powder-applying mechanism can be adjusted to the changed speed of the conveyor. The amount of powder applied can be controlled through adjustment of the powder pump 21 and through the pressure of the air fed through conduit 18.

By providing suction ducts 15 communicating with the housing, excess floating particles of the powdered chemical are removed, and an accurate control of the application of powder to the cheese is maintained by the use of compressed air carrying powder through the ducts 19. If desired, the housing may be maintained under negative pressure so that the air flow is from the outside into the housing and the treating powder does not escape into the operating room.

The anti-microbial food spoilage powder or dust may comprise crystalline sorbic acid, salts of sorbic acid, metal salts of propionic acid, such as soduim and potassium propionates, hydroxyl esters of benzoic acid, and other known food spoilage inhibitors. Since such anti-microbial food spoilage agents are well known, a further detailed description is believed unnecessary.

Specific examples illustrative of the process may be set out as follows:

*Example I*

Cheese pieces at room temperature were passed through the housing 11 on conveyor 14, as illustrated in FIGS. 1 and 2, the air pressure being maintained at about 15 p.s.i. Cheese pieces weighing in the aggregate 5,560 pounds were treated, using 5.75 pounds of sorbic acid. The percent of sorbic acid on each block of cheese was found to be about 0.103 percent based on the cheese weight. The conveyor belt was 10½ feet long and was operated at 42 feet per minute. Good coverage was obtained on all six surfaces of each block of cheese. It was found that about one-third of the sorbic acid particles stuck to the cheese; the remaining two-thirds were recovered from the drawer 13 in the bottom of housing 11. The recovered powder was sieved in a 25 mesh screen to remove particles of cheese, and the recovered powder was reused in the operation.

*Example II*

The process was carried out as described in Example I except that the cheese blocks aggregated 3,060 pounds and the amount of sorbic acid used was 4.25 pounds. The percent of sorbic acid retained on each cheese block was approximately 0.139 percent.

*Example III*

The process was carried out as described in Example I except that cheese pieces aggregated 1,978 pounds and the amount of sorbic acid used was 2.50 pounds. The percent of the coating of sorbic acid on the cheese by weight was 0.129 percent.

*Example IV*

Cheese pieces at room temperature were passed through the housing 11 on conveyor 14, as illustrated in FIGS. 1 and 2, the air pressure being maintained at about 20 p.s.i. Cheese pieces weighing in the aggregate 102.5 pounds were treated, and the percent of sorbic acid on each block of cheese was found to be about 0.14 percent based on the weight of cheese. Good coverage was obtained on all surfaces of each block of cheese and about ⅓ of the sorbic acid particles stuck to the cheese. The remaining powder was recovered in a manner similar to that described in Example I.

*Example V*

The process was carried out as described in Example IV except that 25 p.s.i. air pressure was used and the percent of the coating of sorbic acid on each cheese piece by weight was 0.16 percent.

*Example VI*

The process was carried out as described in Example IV except that the pressure was about 30 p.s.i. and that 144, 10 oz. cheese pieces were treated. The percent of sorbic acid retained on each cheese block was approximately 0.200 percent.

*Example VII*

The process was carried out as described in Example IV except that the cheese pieces aggregated 100 pounds, the air pressure was maintained at about 35 p.s.i. and the percent of the coating of sorbic acid on each cheese piece by weight was about 0.250 percent.

Tests showed that the application of slightly more than 0.1 percent of sorbic acid to the cuts of natural cheese as treated in the above examples was effective in inhibiting mold for long shelf life, while also resulting in no off-flavor with respect to the cheese product. The coatings were substantially uniform on all six sides of each cheese piece or block, the coatings being retained effectively thereon during conveying and wrapping, etc.

While in the foregoing specification we have set forth certain structures and certain steps in considerable detail for the purpose of illustrating embodiments of the invention, it will be understood that such detail or details may be varied widely by those skilled in the art without departing from the spirit of our invention.

We claim:
1. In a process for treating a cheese body to inhibit spoilage, the step of impinging on all sides of said body air streams having a pressure between 10 and 35 pounds per square inch, said air streams carrying a dry antimicrobial food spoilage powder to embed particles of the powder in the cheese.
2. The process of claim 1 in which the air pressure is about 25 pounds per square inch.

References Cited
UNITED STATES PATENTS

| | | | |
|---|---|---|---|
| 2,576,952 | 12/1951 | Lowe et al. | 118—24 |
| 2,585,501 | 2/1952 | Rusoff et al. | 99—116 |
| 2,648,607 | 8/1953 | Krusi | 99—116 |
| 2,865,764 | 12/1958 | Gorsica et al. | 99—150 |
| 2,959,325 | 11/1960 | Beard | 167—82 |
| 3,014,451 | 12/1961 | Rhodes | 118—24 |
| 3,050,401 | 8/1962 | Kohler et al. | 99—157 |

A. LOUIS MONACELL, *Primary Examiner.*

D. M. STEPHENS, *Assistant Examiner.*